United States Patent [19]

Kroupa et al.

[11] Patent Number: 4,500,659
[45] Date of Patent: Feb. 19, 1985

[54] EXTRUDABLE, CURABLE POLYORGANOSILOXANE COMPOSITIONS

[75] Inventors: Loretta A. Kroupa, Midland; Elton H. Relyea, Gladwin, both of Mich.

[73] Assignee: Dow Corning Corporation, Midland, Mich.

[21] Appl. No.: 520,794

[22] Filed: Aug. 5, 1983

[51] Int. Cl.³ ................................................ C08K 3/36
[52] U.S. Cl. .................................. 523/213; 523/212; 524/847; 524/862
[58] Field of Search ................ 523/209, 213; 524/862, 524/847

[56] References Cited

U.S. PATENT DOCUMENTS

| | | | |
|---|---|---|---|
| 3,122,516 | 2/1969 | Polmanteer | 524/862 |
| 3,697,473 | 10/1972 | Polmanteer et al. | 528/31 |
| 3,699,073 | 10/1972 | Wada et al. | 524/785 |
| 3,884,866 | 5/1975 | Jeram et al. | 523/203 |
| 4,013,611 | 3/1977 | Hechtl et al. | 524/862 |
| 4,032,520 | 6/1977 | Lee et al. | 524/862 |
| 4,077,943 | 3/1978 | Sato et al. | 428/447 |
| 4,123,604 | 10/1978 | Sandford | 528/31 |
| 4,162,243 | 7/1979 | Lee et al. | 524/847 |
| 4,163,081 | 7/1979 | Schulz | 428/429 |
| 4,386,170 | 5/1983 | Monroe | 523/213 |
| 4,427,801 | 1/1984 | Sweet | 524/862 |

FOREIGN PATENT DOCUMENTS 55-147553 11/1980 Japan .................... 524/862

*Primary Examiner*—Lewis T. Jacobs
*Attorney, Agent, or Firm*—Robert Spector

[57] ABSTRACT

The processibility of high viscosity, marginally extrudable polyorganosiloxane compositions containing a reinforcing silica filler and a filler treating agent to prevent crepe hardening of the compositions is improved by the presence in said treating agent of at least one component that is incompatible with the polydimethylsiloxane portion of the curable composition prior to the reaction of said component with the filler.

14 Claims, No Drawings

EXTRUDABLE, CURABLE POLYORGANOSILOXANE COMPOSITIONS

BACKGROUND OF THE INVENTION

1. Field of the Invention

This invention relates to extrudable polyorganosiloxane compositions that can be cured to form elastomeric materials. More particularly, this invention relates to a class of filler treating agents for marginally extrudable polyorganosiloxane compositions that improve the processability of the composition without adversely affecting the tensile properties and hardness of the cured elastomer.

2. Description of the Prior Art

Polyorganosiloxane compositions that can be cured to form elastomeric products range in consistency from pourable liquids to stiff, virtually nonflowable gums. For certain applications it is desirable to employ compositions that can readily be extruded or injected into a mold under relatively low pressures and subsequently cured to yield elastomers having specified minimum values of tensile strength, elongation and hardness.

Extrudable polyorganosiloxane compositions which are cured by means of the platinum catalyzed addition reaction of silicon-bonded hydrogen atoms to vinyl radicals are disclosed in U.S. Pat. No. 4,162,243, which issued to Lee et al. on July 24, 1979. U.S. patent application Ser. No. 368,331 filed in the name of R. Sweet and assigned to Dow Corning Corporation, to whom the present application is also assigned, discloses modifying some of the compositions of the aforementioned Lee et al. patent by including certain benzene-soluble resinous organosiloxane copolymers for the purpose of increasing the durometer of the cured elastomer. Some of the curable compositions encompassed by Lee et al. and by Sweet are so high in viscosity that they cannot be extruded at a useful rate using conventional extrusion equipment and conditions. In addition, the resin may increase the adhesive quality of a composition to the extent that it adheres to the walls of mixers and other processing equipment, and can only be removed by manual scraping, a costly and time consuming process.

One objective of this invention is to improve the processability of certain high viscosity, marginally extrudable polyorganosiloxane compositions without adversely affecting the values of tensile strength, elongation, and hardness that can be achieved in cured elastomers prepared using these compositions.

SUMMARY OF THE INVENTION

The foregoing objective can be achieved by reacting the reinforcing silica filler in certain high viscosity, marginally extrudable silicone elastomer composition with a liquid flourinated polyorganosiloxane.

DETAILED DESCRIPTION OF THE INVENTION

This invention provides an extrudable, curable silicone elastomer composition exhibiting a viscosity of at least 100 Pa·s at 25° C. and comprising a product obtained by mixing (A) 100 parts by weight of a liquid triorganosiloxy-endblocked polydimethylsiloxane wherein the triorganosiloxy units are dimethylvinylsiloxy or methylphenylvinyl siloxy and the polydimethylsiloxane exhibits a viscosity of from 1 to 100 Pa·s at 25° C.; (B) from 10 to 85 parts by weight of a reinforcing silica filler having a surface area of at least 50 $m^2/g$, said filler having been reacted with a liquid or solubilized treating agent wherein at least one component of said treating agent is a liquid hydroxyl enblocked polyorganosiloxane wherein at least 50% of the silicon atoms are bonded to a fluorine-substituted hydrocarbon radical; (C) a liquid methylhydrogensiloxane in an amount sufficient to provide from 1 to 3 silicon-bonded hydrogen atoms per vinyl radical present in said curable elastomer composition, said methylhydrogensiloxane having an average of at least three silicon-bonded hydrogen atoms per molecule and consisting essentially of units selected from the group consisting of methylhydrogensiloxane, dimethylsiloxane, dimethylhydrogensiloxy, trimethylsiloxy, and $SiO_{4/2}$ units; and (D) a platinum-containing catalyst in sufficient amount to provide at least 0.1 part by weight of platinum per million parts by weight of said triorganosiloxy endblocked polydimethylsiloxane.

The feature which distinguishes the present extrudable silicone elastomer compositions from those of the prior art, is the combination of the high viscosity of the present compositions, which is at least 100 Pa·s, and the presence of a reinforcing silica filler containing a bonded treating agent that would be incompatible with the polydimethylsiloxane component of the composition if it were not bonded to the silica. Experimental data demonstrate that the presence of as little as 0.1 part by weight per 100 parts of polydimethylsiloxane of this treating agent on the surface of the reinforcing silica filler improves the processability of the composition sufficiently to convert a composition which is considered marginally extrudable, i.e., it cannot be extruded at a rate greater than about 15 grams per minute through a 0.32 cm. diameter orifice under a pressure of 620 kPa, to a composition that can be easily extruded at a commercially useful rate under identical conditions.

As used in this specification, the term "incompatible" implies that a liquid or solubilized material, in this instance a silica treating agent, is insoluble in the polydimethylsiloxane portion of the extrudable elastomer composition at the concentration level at which the incompatible treating agent is present in the composition.

In addition to being incompatible with the polydimethylsiloxane, the incompatible portion of the present silica treating agents must, by definition, form a strong chemical or physical bond with the reinforcing silica filler (B). The surface of the silica filler is believed to contain silicon-bonded hydroxyl groups and/or silicon-bonded oxygen atoms with which the treating agent can associate by chemical and/or physical means.

If the incompatible silica treating agent were not bonded to or otherwise strongly associated with the silica filler particles, the additive would, in all likelihood, migrate to the surface of the cured elastomer and exhude as a liquid or solid material that would make the cured elastomer unacceptable for many intended end uses.

Of the classes of incompatible filler treating agents, fluorinated organosilicon materials are preferred for use in the compositions of this invention.

A preferred group of organosilicon treating agents includes liquid hydroxyl endblocked polyorganosiloxanes wherein at least about 50% of the silicon atoms in a molecule are bonded to a fluorine-substituted hydrocarbon radical, most preferably 3,3,3-trifluoropropyl radicals. Polydiorganosiloxanes of this type typically exhibit viscosities within the range from 0.01 to 1.0 Pa·s at 25° C. Most preferably the treating agent is a hydroxyl endblocked poly(3,3,3-trifluoropropylmethyl)-siloxane exhibiting a viscosity of about 0.1 Pa·s. This preference is based on the availability of these polymers and the ability of relatively small amounts to improve the processability of marginally extrudable silica-filled polydimethylsiloxane compositions. Extrudable compositions can contain as little as 0.1 part by weight of these preferred incompatible silica treating agents per 100 parts by weight of silica filler (B). Improvements in processability can be achieved at concentrations of up to about 4 parts by weight. A concentration range of from 0.5 to 3 parts by weight per 100 parts by weight of (B) is preferred. When the amount of treating agent exceeds about 4 parts by weight per 100 parts by weight of (B), there appears to be a decrease in the ease of processing the curable composition, as evidenced by a decrease in the maximum rate at which the composition can be extruded.

Polydimethylsiloxane (A) contains dimethylvinylsiloxy or methylphenylvinylsiloxy terminal groups and exhibits a viscosity of from 1 to 100 Pa·s at 25° C., preferably from 10 to 50 Pa·s. Polydimethylsiloxanes exhibiting viscosities less than 1 Pa·s typically do not yield useful physical property profiles when cured in combination with the other components of the present compositions. When the polydimethylsiloxane exhibits a viscosity greater than about 100 Pa·s, it is usually not feasible to add the amount of reinforcing filler required to achieve useful tensile properties and hardness and still maintain the viscosity of the curable composition at a processable level, even in the presence of the silica treating agents of this invention.

The reinforcing silica filler employed in the present extrudable compositions can be any of the available types of finely divided amorphorus silica having a surface area of at least 50 square meters per gram ($m^2/g$). Two preferred silicas are referred to as fumed silicas and precipitated silicas. These silicas typically have surface areas greater than 100 $m^2/g$. Reinforcing silica fillers are often treated to prevent or inhibit an undesirable interaction between the filler and polyorganosiloxanes. This interaction is known as "crepe hardening." The silica filler can be treated prior to being combined with the other ingredients of the present extrudable compositions or the silica can be treated in situ during preparation of the composition. Methods for pretreating reinforcing silica using organosilanes, orgnosiloxanes, and silazanes as treating agents are described in the prior art, including U.S. Pat. No. 3,122,516, issued on Feb. 25, 1969 to Polmanteer; U.S. Pat. No. 3,334,062 issued on Aug. 1, 1967 to Brown and Hyde; U.S. Pat. No. 3,635,743, issued on Jan. 18, 1972 to Smith; and U.S. Pat. No. 3,624,023, issued on Nov. 30, 1977 to Hartage. These patents are hereby incorporated by reference to show the preparation of treated reinforcing silica fillers.

If the silica filler has not been pretreated, it is necessary to treat it in situ during preparation of the curable compositions of this invention by adding the treating agents together with the other ingredients of the composition.

Irrespective of whether the silica filler is pretreated or treated during preparation of the extrudable compositions of this invention, the silica treating agent includes at least one material that is incompatible with liquid polydimethylsiloxanes until said material has become associated with the silica filler as described hereinbefore.

The amount of incompatible treating agent present in the extrudable composition is usually insufficient to prevent or inhibit the phenomenon referred to hereinbefore as "crepe hardening," and it is therefore usually necessary to employ the incompatible silica treating agents in combination with compatible treating agents which would be typically used in compositions containing at least one polydimethylsiloxane as the curable material. These conventional silica treating agents are soluble in, or at least compatible with, the other components of the curable composition, particularly polydimethylsiloxane (A), and include silanes, silazanes, and siloxanes. Hexaorganodisilazanes and low molecular weight hydroxyl- or alkoxy endblocked polydiorganosiloxanes containing an average of from 2 to about 20 siloxane units per molecule constitute a preferred class of treating agents.

The hydrocarbon radicals present on the silicon atoms of the treating agent can be alkyl such as methyl, and aryl such as phenyl. In order for the treating agent to be compatible with the polydimethylsiloxane component of the present composition, it is believed that at least about 80 mole % of the hydrocarbon radicals must be alkyl containing from 1 to 4 carbon atoms or alkenyl containing from 2 to 4 carbon atoms. Most preferably these hydrocarbon radicals are methyl or vinyl.

Liquid polyorganosiloxanes containing from 1 to 20% by weight of hydroxyl groups, from 1 to 31% by weight of vinyl radicals and from 1 to 2 methyl radicals per silicon atom are preferably included as compatible components of the silica treating agent because of the high levels of tensile properties exhibited by the cured elastomers relative to elastomers prepared using fillers that have been treated with vinyl-free organosilicon materials.

The total amount of silica treating agent to be used in the extrudable compositions of this invention is at least partially dependent on the type of agents employed and the total surface area of the reinforcing filler. As the filler surface area increases, a proportional increase in the amount of treating agent is usually required to prevent or inhibit crepe hardening. Methods for determining the amount of treating agent suitable for use with a given type of reinforcing silica filler are known in the art. When hydroxyl endblocked liquid polyorganosiloxanes are used as the compatible portion of the present silica treating agents, the total amount of treating agent required, which includes both incompatible and compatible portions, will typically be from 1 to 20 parts by weight of treating agent per 100 parts by weight of silica present in the composition.

The amount of silica filler suitable for use in the curable compositions of this invention is dependent upon a number of factors, including the viscosity of the composition in the absence of the filler and the physical properties desired in the cured elastomer. Typical compositions contain from 10 to 85 parts by weight of treated reinforcing silica per 100 parts by weight of polydimethylsiloxane (A). Preferably the silica content will be from 20 to 60 parts by weight. By employing at least one of the incompatible silica treating agents that characterize the present extrudable compositions, it is possible to substantially increase the maximum amount of filler that can be incorporated into a curable composition and still retain a commercially useful degree of extrudability.

The extrudable compositions of this invention are cured by the reaction of the vinyl radicals present in the terminal groups of the polydimethylsiloxane with a liquid methylhydrogensiloxane (C) containing at least three silicon-bonded hydrogen atoms per molecule. This reaction is catalyzed by the platinum-containing catalyst (D), which is a required component of the present compositions.

Methylhydrogensiloxanes containing at least three silicon-bonded hydrogen atoms per molecule are well known in the art, and are described in U.S. Pat. No. 3,697,473, which issued on Oct. 10, 1972, to Polmanteer et al. and in U.S. Pat. No. 3,989,667, which issued on Nov. 2, 1976 to Lee et al. These patents are hereby incorporated by reference to show useful curing agents for the present compositions.

The methylhydrogensiloxane (C) can be any of the known methylhydrogensiloxanes having an average of at least 3, preferably at least 4 silicon-bonded hydrogen atoms per molecule and an average of no more than one silicon-bonded hydrogen atom per silicon atom. The remaining valences of the silicon atoms are satisfied by methyl radicals and divalent oxygen atoms. Ingredient (C) can be a homopolymer, copolymer, or a mixture thereof. Suitable methylhydrogensiloxanes contain methylhydrogensiloxane units, dimethylhydrogensiloxy units, and may also contain dimethylsiloxane units, trimethylsiloxy units, and $SiO_{4/2}$ units. Some specific examples of representative methylhydrogensiloxanes include cyclic polymethylhydrogensiloxanes, copolymers containing trimethylsiloxy and methylhydrogensiloxane units, copolymers of trimethylsiloxy, dimethylsiloxane, and methylhydrogensiloxane units and copolymers of dimethylhydrogensiloxy, dimethylsiloxane, and methylhydrogensiloxane units. The amount of (C) present in a curable organopolysiloxane composition is sufficient to provide from 1 to 3 silicon-bonded hydrogen atoms per vinyl radical present in the curable organopolysiloxane composition. The ingredients of this composition which contain vinyl radicals include the vinyl terminated polydimethylsiloxane (A), any vinyl-containing silica treating agents and any vinyl-containing modifiers described hereinafter.

In order to be effective, (C) must be compatible with, and preferably soluble in the compositions of this invention. "Compatible" implies that at the required concentration level, (C) is at least partially soluble in the composition and will remain in a uniformly dispersed state until the curing reaction is substantially complete.

The catalyst (D) employed in the present compositions can be any of the platinum-containing compositions that are known to catalyze the reaction between silicon-bonded hydrogen atoms and olefinic double bonds, such as are present in the polydimethylsiloxane, which must also be a solvent or dispersant for the catalyst. A preferred class of catalysts are the complexes prepared from chloroplatinic acid and certain unsaturated organosilicon compounds, such as described by Willing in U.S. Pat. No. 3,419,593 which issued on Dec. 31, 1968 and is hereby incorporated by reference to show these complexes and their preparation. One particularly preferred catalyst of this type is a reaction product of chloroplatinic acid and sym-divinyltetramethyldisiloxane.

The catalyst (D) can be present in an amount sufficient to provide at least 0.1 part by weight of platinum for every one million parts by weight of polydimethylsiloxane. It is preferred to use sufficient catalyst so that there is present from 5 to 50 parts by weight platinum for every one million parts by weight of the polydimethylsiloxane. Amounts of platinum greater than 50 parts per million are effective, but are unnecessary and wasteful, especially when the preferred catalyst is used.

Mixtures containing the foregoing ingredients (A), (C) and (D) may begin to cure immediately on mixing at room temperature. It may therefore be desirable to retard the activity of the catalyst (D) using a suitable platinum catalyst inhibitor if a one-package extrudable composition is to be stored before converting it to a shaped article or if it is desired to increase the pot life, i.e., the working time, of a 2-package composition. Platinum catalyst inhibitors are used to retard the catalytic activity of the platinum at a temperature below about 50° C., but allow the platinum to catalyze the reaction of the polydimethylsiloxane and any other vinyl-containing components with the methylhydrogensiloxane at temperatures above about 70° C.

One useful type of platinum catalyst inhibitor is described in U.S. Pat. No. 3,445,420, which issued on May 20, 1969 to Kookootsedes et al. and is hereby incorporated by reference to show certain acetylenic inhibitors and their use. A preferred class of acetylenic inhibitors are the acetylenic alcohols, especially 2-methyl-3-butyn-2-ol.

A second type of platinum catalyst inhibitor is described in U.S. Pat. No. 3,989,667, which issued on Nov. 2, 1976 to Lee and Marko and is hereby incorporated by reference to show certain olefinic siloxanes, their preparation and their use as platinum catalyst inhibitors.

A third type of platinum catalyst inhibitor includes polymethylvinylcyclosiloxanes having three to six methylvinylsiloxane units per molecule.

The optimum concentration of platinum catalyst inhibitor is that which will provide the desired storage stability or pot life at ambient temperature without excessively prolonging the time interval required to cure the present extrudable compositions at elevated temperatures. This amount will vary widely and will depend upon the particular inhibitor that is used, the nature and concentration of the platinum-containing catalyst and the nature of the methylhydrogensiloxane.

Inhibitor concentrations as low as one mole of inhibitor per mole of platinum will in some instances yield a desirable level of storage stability and a sufficiently short curing period at temperatures above about 70° C. In other cases, inhibitor concentrations of up to 10, 50, 100, 500 or more moles per mole of platinum may be needed. The optimum concentration for a particular inhibitor in a given composition can be determined by routine experimentation.

The extrudable compositions of this invention can include conventional optional additives and modifiers such as pigments, extending fillers, flame retardants, and heat stabilizers.

A preferred additive that improves the tensile properties of cured elastomers prepared using the present extrudable compositions is a group of benzene-soluble resinous, hydroxylated organosiloxane copolymers characterized by repeating units of the formulae (a) $R_2^1(CH_2=CH-SiO_{0.5}$, (b) $R_3^2SiO_{0.5}$, and (c) $SiO_{4/2}$, where $R^1$ and $R^2$ individually represent alkyl radicals containing from 1 to 4 carbon atoms, with the proviso that at least 95% of $R^1$ and $R^2$ are methyl. Most preferably all the $R^1$ and $R^2$ groups are methyl. Units represented by formula (a) constitute from 3 to 10 mol % of the copolymer and the molar ratio of the combination of (a) and (b) units to (c) units is from 0.6:1 to 1.1:1.

Resinous copolymers containing the aforementioned (a), (b), and (c) units can be prepared using a modification of the procedure described in U.S. Pat. No. 2,676,182, which issued on Apr. 20, 1954 to Daudt and Tyler, and is hereby incorporated in its entirety by reference. The copolymers described in this patent contain from 2 to 3 percent by weight of hydroxyl groups, which is considerably above the level of about 0.7 weight percent desired for a resinous copolymer component of the present compositions. The hydroxyl content of the resin is conveniently reduced to the desired level by employing a higher concentration of triorganosiloxane capping agent, or a precursor thereof, than the concentration range taught in the aforementioned U.S. Pat. No. 2,676,182. Briefly, the method of Daudt and Tyler comprises reacting under acidic conditions a silica hydrosol with at least one triorganosubstituted siloxane, such as hexamethyldisiloxane, or hydrolyzable triorganosilanes such as trimethylchlorosilane. To prepare the present resin additives, the amount of the appropriate vinyl-containing silazane, siloxane, or silane equivalent to the desired concentration of vinyl radicals would also be present in the reaction mixture in an amount sufficient to provide from 3 to about 10 mol % of vinyl-containing siloxane groups in the final product.

The concentration of resinous organosiloxane copolymer in the curable compositions of this invention is critical with respect to the properties achieved following curing. Less than about 10%, based on the weight of the polydimethylsiloxane (A) will not yield any significant improvement in durometer, and tear strength of the final cured elastomer, while more than about 50% by weight will increase the viscosity of the curable composition to the extent that it cannot be processed at a useful rate under the conditions of temperature and pressure employed in commercial extrusion and injection molding equipment.

The viscosity of extrudable compositions containing the aforementioned resinous organosiloxane copolymer as an additive is a function of at least three parameters, namely the viscosity of (A), the concentration of silica, and the concentration of organosiloxane copolymer. Using the viscosity range for (A) of 1 to 100 Pa·s at 25° C. and typical values for reinforcing silica content of 10 to 85 parts by weight per 100 parts by weight of (A), the optimum concentration range for the organosiloxane copolymer appears to be from about 10 to about 40 parts by weight per 100 parts of (A).

It will be understood that as the viscosity of (A) and/or the silica content increase, it may be necessary to reduce the concentration of resinous organosiloxane copolymer to prepare a processible composition. Alternatively, the silica content and/or the viscosity of (A) can be reduced if it is desired to employ more than about 40% of the copolymer, based on the weight of (A) or the amount of incompatible silica treating agent should be increased within the present limits.

All of the ingredients of the present compositions can be incorporated into a single package which is usually stable for at least several hours at temperatures below about 40° C., particularly if one of the aforementioned catalyst inhibitors is present.

If the present compositions will be stored for extended periods of time or exposed to temperatures above about 40° C. prior to shaping and curing them, it is usually preferable to package the methylhydrogensiloxane and the platinum catalyst in separate containers and combine them just prior to use.

In a preferred embodiment of a 2-package system, a homogeneous mixture containing all of the components of a composition except the catalyst, inhibitor and methylhydrogensiloxane is divided into two substantially equal portions. One portion is combined with the catalyst and the second portion is combined with the catalyst inhibitor and the methylhydrogensiloxane. The two resultant mixtures are blended together at the time of use.

The extrudable compositions of this invention are conveniently prepared using conventional dough type mixing equipment, including equipment manufactured for this purpose by Baker Perkins, Inc. The order of addition of the various components is not critical if the composition will be processed to form a shaped article shortly after being prepared. To facilitate processing of the composition, the polydimethylsiloxane, reinforcing silica (either pretreated or in combination with the in situ treating agents), the optional resinous organosiloxane copolymer additive and the platinum-containing catalyst are first blended together to form a homogeneous mixture, followed by addition of the methylhydrogensiloxane. This procedure allows the relatively small amount of catalyst to become well dispersed in the composition prior to the initiation of the curing reaction.

As previously disclosed, the use of known catalyst inhibitors will allow a mixture containing all of the components of the present extrudable compositions to be stored for substantial periods of time at temperatures below about 40° C. without adversely affecting the ability of the composition to cure relatively rapidly at temperatures of 70° C. and above.

The compositions of this invention can be formed into shaped articles by conventional methods. The rheological properties of these compositions make them eminently suitable for extrusion or injection molding. During the latter process the composition is injected into one or more molds heated to at least 70° C. under relatively low pressures that are typically in the order of 600 kPa. The compositions cure relatively rapidly under these conditions, and can often be removed from the mold without having to cool the mold.

The viscosity of preferred extrudable compositions of this invention is such that they can be extruded through a 3.2 mm-diameter orifice at a rate of from 20 to 50 grams per minute using a cylinder pressure of 620 kPa.

The following example is presented for illustrative purposes and should not be construed as limiting the invention which is encompassed by the accompanying claims. All parts and percentages are by weight unless otherwise specified.

EXAMPLE 1

This example demonstrates the improvement in processibility achieved by addition of an incompatible silica treating agent and the negligible effect of this addition on the tensile properties and hardness of the cured elastomer.

The formulations described in this example were prepared by blending in a dough type mixer 1 part by weight of water, 0.45 part of a vinyl-containing silica treating agent, 0, 0.2, 0.4, or 2.0 part of an incompatible silica treating agent, 6 parts of hexamethyldisilazane, and 57.6 parts of a mixture (composition I) containing (1) 74.5% by weight of a dimethylvinylsiloxy terminated polydimethylsiloxane having a viscosity of from 25 to 35 Pa·s at 25° C., and (2) 25.5% by weight of a benzene-soluble resinous organosiloxane copolymer containing 5 mol % $(CH_3)_2CH_2=CH-SiO_{\frac{1}{2}}$ units (a), 41 mol % trimethylsiloxy units (b), and 54 mol % $SiO_{4/2}$ units (c). The molar ratio of the combination of (a) and (b) units to (c) units was 0.85:1, and the hydroxyl content of the resin was about 0.6% by weight.

The vinyl-containing silica treating agent was a hydroxyl-terminated diorganopolysiloxane having a viscosity of about 40 centistokes at 25° C. and containing dimethylsiloxane and methylvinylsiloxane units in a molar ratio of about 1.8 to 1.

The incompatible silica treating agent was a hydroxyl-terminated poly(methyl-3,3,3-trifluoropropyl)siloxane having a viscosity within the range of from 0.07 to 0.13 Pa·s at 25° C.

To the aforementioned initial mixture was gradually added 36 parts of a fumed silica having a surface area of about 400 square meters per gram.

During the mixing cycle it is believed that the vinyl-containing silica treating agent, water, the incompatible silica treating agent, and the hexamethyldisilazane react with hydroxyl groups and/or oxygen atoms present on the surface of the silica.

Following completion of the silica addition the resultant mixture was blended at a temperature of 150° C. and sub-atmospheric pressure for 1½ hours to remove volatile materials. At the end of this time period, 42.4 parts of composition I were added and mixing was continued until a homogeneous material was obtained. The resultant product (composition II) was cooled to ambient temperature and combined with 8.0 parts of a liquid trimethylsiloxy-terminated polymethylhydrogensiloxane having a viscosity of about 0.03 Pa·s at 25° C. and 0.22 part of 2-methyl-3-butyn-2-ol as a catalyst inhibitor. A second batch of composition II was prepared using the same relative amounts of ingredients defined hereinabove and combined with 0.2 part of a chloroplatinic acid complex of symmetrical tetramethyldivinyldisiloxane diluted with sufficient methylphenylvinylsiloxy terminated polydimethylsiloxane to provide a platinum content of 0.7% by weight.

Extrudable compositions containing from 0 to 2 parts of the incompatible silica treating agent were prepared by combining equal weights of the aforementioned two batches of composition II to form a homogeneous mixture that exhibited a viscosity above 100 Pa·s at 25° C. Each of the compositions were extruded through a 0.32 cm.-diameter circular orifice under a pressure of 621 kilopascals. The extrusion rate for each of the 4 compositions tested are reported in the accompanying Table 1. Samples of each composition were molded to form test specimens for evaluation of durometer, tensile strength at break, elongation at break and "die B" tear strength. The test specimens were cured in a hydraulic press for five minutes at a temperature of 170° C. prior to being evaluated. The results of these evaluations are reported in the accompanying Table 1.

TABLE 1

| Parts of Incompatible Treating Agent* | Extrusion Rate (g./minute) | Durometer Hardness (Shore A) | Tensile Strength (MPa) | Elongation (%) | Tear Strength Die B (kN/m) |
|---|---|---|---|---|---|
| 0 (control)** | 4 | 67 | 9.8 | 680 | 49.0 |
| 0.56 | 39 | 67 | 8.6 | 670 | 47.3 |
| 1.1 | 22 | 67 | 8.8 | 570 | 44.6 |
| 5.6 (control) | 5 | 68 | 8.8 | 670 | 47.3 |

*Based on 100 parts of silica.
**Composition adhered to metal surfaces of mixing equipment, could only be removed by scraping. All other compositions flowed freely from the mixer through the extrusion orifice.

The foregoing data demonstrate that compositions containing 0.5 to 1.1 parts by weight of the incompatible filler treating agent per 100 parts by weight of silica flowed freely from the mixing chamber into the extruder and were extruded at 5 or 10 times the rate of the controls which contained no incompatible silica treating agent or an amount (5.6 parts) that is above the upper limit of 4 parts per 100 parts by weight of silica defined for this type of incompatible treating agent in the present extrudable compositions. The data also demonstrate that the presence of the incompatible silica treating agent did not adversely affect the physical properties of the cured elastomer.

That which is claimed is:

1. An extrudable, curable silicone elastomer composition exhibiting a viscosity of at least 100 Pa·s at 25° C. and comprising a product obtained by mixing
   (A) 100 parts by weight of a liquid triorganosiloxy-endblocked polydimethylsiloxane wherein the triorganosiloxy units are dimethylvinylsiloxy or methylphenylvinylsiloxy and the polydimethylsiloxane exhibits a viscosity of from 1 to 100 Pa·s at 25° C.;
   (B) from 10 to 85 parts by weight of a reinforcing silica filler having a surface area of at least 50 m²/g, said filler having been reacted with a liquid or solubilized treating agent wherein at least a portion of said treating agent is a liquid, hydroxyl endblocked polyorganosiloxane wherein at least 50% of the silicon atoms are bonded to a fluorine-substituted hydrocarbon radical;
   (C) a liquid methylhydrogensiloxane in an amount sufficient to provide from 1 to 3 silicon-bonded hydrogen atoms per vinyl radical present in said curable elastomer composition, said methylhydrogensiloxane having an average of at least three silicon-bonded hydrogen atoms per molecule and consisting essentially of units selected from the group consisting of methylhydrogensiloxane, dimethylsiloxane, dimethylhydrogensiloxy, trimethylsiloxy and $SiO_{4/2}$ units; and
   (D) a platinum-containing catalyst in sufficient amount to provide at least 0.1 part by weight of platinum per million parts by weight of said triorganosiloxy endblocked polydimethylsiloxane.

2. An extrudable composition according to claim 1 where said fluorine-substituted hydrocarbon radical is a 3,3,3-trifluoropropyl radical.

3. An extrudable composition according to claim 1 where said liquid, hydroxyl endblocked polyorganosiloxane is a hydroxyl endblocked poly(methyl-3,3,3-trifluoropropyl)siloxane exhibiting a viscosity of from 0.01 to 1.0 Pa·s at 25° C.

4. An extrudable composition according to claim 1 where the concentration of the liquid, hydroxyl endblocked polyorganosiloxane is from 0.1 to 4 parts by weight per 100 parts by weight of silica.

5. An extrudable composition according to claim 4 wherein the concentration of said liquid, hydroxyl endblocked polyorganosiloxane is from 0.5 to 3 parts by weight per 100 parts by weight of silica.

6. An extrudable composition according to claim 1 where said treating agent includes at least one compatible liquid polyorganosiloxane containing from 1 to 20% by weight of hydroxyl groups, from 1 to 31% by weight of vinyl radicals, and from 1 to 2 methyl radicals per silicon atom.

7. An extrudable composition according to claim 1 where the total concentration of said treating agent is from 1 to 20 parts by weight per 100 parts by weight of silica.

8. An extrudable composition according to claim 1 where said reinforcing silica filler is of the precipitated or fumed type.

9. An extrudable composition according to claim 1 where the concentration of reinforcing filler is from 20 to 60 parts by weight per 100 parts by weight of (A).

10. An extrudable composition according to claim 1 where said composition contains a platinum catalyst inhibitor in an amount sufficient to inhibit curing of said extrudable composition at temperatures below about 50° C.

11. An extrudable composition according to claim 10 where said inhibitor is an acetylenic alcohol.

12. An extrudable composition according to claim 11 where said inhibitor is 2-methyl-3-butyn-2-ol.

13. An extrudable composition according to claim 1 where said composition contains at least one benzene-soluble resinous organosiloxane copolymer characterized by repeating units of the formulae (a) $R_2^1(CH_2=CH-SiO_{0.5}$, (b) $R_3^2SiO_{0.5}$, and (c) $SiO_{4/2}$, where $R^1$ and $R^2$ individually represent alkyl radicals containing from 1 to 4 carbon atoms or a phenyl radical, with proviso that at least 95% of $R^1$ and $R^2$ are methyl radicals, the molar ratio of the combination of (a) and (b) units to (c) units is from 0.6:1 to 1.1:1, and the (a) units constitute from 3 to 10 mol % of said copolymer.

14. An extrudable composition according to claim 13 where the concentration of said organosiloxane copolymer is from 10 to 40%, based on the weight of polydimethylsiloxane present in said composition.

* * * * *

UNITED STATES PATENT AND TRADEMARK OFFICE
CERTIFICATE OF CORRECTION

PATENT NO. : 4,500,659

DATED : February 19, 1985

INVENTOR(S) : Loretta A. Kroupa and Elton H. Relyea

It is certified that error appears in the above-identified patent and that said Letters Patent is hereby corrected as shown below:

Column 6, line 63, and column 12, line 14 - Delete "$R^1_2(CH_2=CHSiO_{0.5}$"

and substitute therefor --- $R^1_2(CH_2=CH)SiO_{0.5}$ --- .

Signed and Sealed this

Second Day of July 1985

[SEAL]

Attest:

DONALD J. QUIGG

Attesting Officer     Acting Commissioner of Patents and Trademarks